United States Patent
Yamaoka et al.

(10) Patent No.: US 11,433,711 B2
(45) Date of Patent: Sep. 6, 2022

(54) TIRE

(71) Applicant: SUMITOMO RUBBER INDUSTRIES, LTD., Hyogo (JP)

(72) Inventors: Hiroshi Yamaoka, Hyogo (JP); Yoshiaki Kanematsu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 266 days.

(21) Appl. No.: 16/879,981

(22) Filed: May 21, 2020

(65) Prior Publication Data
US 2020/0376898 A1 Dec. 3, 2020

(30) Foreign Application Priority Data

May 31, 2019 (JP) .............................. JP2019-102098

(51) Int. Cl.
*B60C 11/12* (2006.01)
*B60C 11/03* (2006.01)

(52) U.S. Cl.
CPC ...... *B60C 11/1218* (2013.01); *B60C 11/0304* (2013.01); *B60C 11/1236* (2013.01); *B60C 11/1281* (2013.01)

(58) Field of Classification Search
CPC .......................... B60C 11/01; B60C 2011/013
See application file for complete search history.

(56) References Cited

U.S. PATENT DOCUMENTS

| | | | |
|---|---|---|---|
| 2013/0213542 A1* | 8/2013 | Warfford | B60C 11/12 152/209.1 |
| 2015/0224826 A1* | 8/2015 | Ochi | B60C 5/00 152/209.16 |
| 2017/0015144 A1* | 1/2017 | Ogihara | B60C 11/1204 |
| 2017/0120692 A1* | 5/2017 | Durand-Gasselin | B60C 11/0306 |

(Continued)

FOREIGN PATENT DOCUMENTS

EP 0625436 A1 11/1994
JP S48-37801 A 6/1973

(Continued)

OTHER PUBLICATIONS

European Search Report, European Patent Office, Application No. 20176777.9, dated Jul. 21, 2020.

*Primary Examiner* — Yung-Sheng M Tsui
(74) *Attorney, Agent, or Firm* — Greenblum & Bernstein, P.L.C.

(57) ABSTRACT

In a tire having a composite groove provided on a shoulder land portion, the durability of the shoulder land portion is improved. The tire includes a tread portion. The tread portion includes a first shoulder land portion including a first tread edge. The first shoulder land portion has a shoulder composite groove, and a recess formed on a buttress surface. The recess includes an opening edge on the buttress surface, a bottom surface along the buttress surface, and an inner wall surface connecting the opening edge to the bottom surface. The shoulder composite groove includes, in a transverse cross section thereof, a sipe element having a width (Continued)

not greater than 1.5 mm and extending in a tire radial direction, and a groove element connected to an inner side in the tire radial direction of the sipe element and having a width greater than 1.5 mm. The groove element is open at the bottom surface of the recess.

19 Claims, 6 Drawing Sheets

(56) References Cited

U.S. PATENT DOCUMENTS

| | | | | |
|---|---|---|---|---|
| 2017/0166015 | A1* | 6/2017 | Christenbury | B60C 11/1218 |
| 2017/0239998 | A1* | 8/2017 | Lawson | B60C 11/0306 |
| 2018/0043737 | A1* | 2/2018 | Akashi | B60C 11/01 |
| 2018/0104992 | A1* | 4/2018 | Vantal | B60C 11/01 |
| 2018/0312006 | A1* | 11/2018 | Bonnet | B60C 9/0064 |
| 2019/0016179 | A1* | 1/2019 | Yamakawa | B60C 11/1204 |
| 2020/0139765 | A1* | 5/2020 | Kawauchi | B60C 11/1204 |

FOREIGN PATENT DOCUMENTS

| | | |
|---|---|---|
| JP | 2006-298057 | 11/2006 |
| WO | 2012/058171 A1 | 5/2012 |
| WO | 2016/003435 A | 1/2016 |
| WO | 2016/061358 A1 | 4/2016 |
| WO | 2016/156705 A1 | 10/2016 |
| WO | 2017/072139 A1 | 5/2017 |

* cited by examiner

TIRE

BACKGROUND OF THE INVENTION

Field of the Invention

The present invention relates to a tire and specifically relates to a tire having a composite groove provided on a shoulder land portion.

Description of the Background Art

The tire disclosed in Japanese Laid-Open Patent Publication No. 2006-298057 has sipe-like narrow grooves on a shoulder block. Each sipe-like narrow groove includes a sipe portion and a widened portion connected to the inner side in the tire radial direction of the sipe portion. In the tire of Japanese Laid-Open Patent Publication No. 2006-298057, the widened portion is expected to have an effect of sucking up a water film.

As in the tire of Japanese Laid-Open Patent Publication No. 2006-298057, a shoulder land portion provided with composite grooves each having a groove width increased at the inner side in the tire radial direction tends to be easily damaged at an end portion on the buttress surface side of each composite groove. Thus, improvement is required in this regard.

SUMMARY OF THE INVENTION

The present invention has been made in view of the above-described problem, and a main object of the present invention is to be able to improve durability of a shoulder land portion in a tire having a composite groove provided on the shoulder land portion.

The present invention is directed to a tire including a tread portion, wherein the tread portion includes a first shoulder land portion including a first tread edge, the first shoulder land portion includes a buttress surface outward of the first tread edge in a tire axial direction, the first shoulder land portion has a shoulder composite groove crossing the first tread edge and open at the buttress surface, and a recess formed on the buttress surface, the recess includes an opening edge on the buttress surface, a bottom surface along the buttress surface, and an inner wall surface connecting the opening edge to the bottom surface, the shoulder composite groove includes, in a transverse cross section thereof, a sipe element having a width not greater than 1.5 mm and extending in a tire radial direction, and a groove element connected to an inner side in the tire radial direction of the sipe element and having a width greater than 1.5 mm, and the groove element is open at the bottom surface of the recess.

In the tire according to the present invention, an entirety of the opening edge of the recess is preferably located outward of the first tread edge in the tire axial direction.

In the tire according to the present invention, the groove element is preferably open at the bottom surface without protruding from the bottom surface.

In the tire according to the present invention, preferably, a length in a tire circumferential direction of the recess gradually increases toward an inner side in the tire radial direction.

In the tire according to the present invention, the opening edge of the recess preferably has a trapezoidal shape.

In the tire according to the present invention, a minimum length in the tire circumferential direction of the recess is preferably 0.50 to 0.70 times a maximum length in the tire circumferential direction of the recess.

In the tire according to the present invention, preferably, a plurality of the shoulder composite grooves are provided in a tire circumferential direction, and a maximum length in the tire circumferential direction of the recess is 0.10 to 0.40 times an arrangement pitch in the tire circumferential direction of the shoulder composite grooves.

In the tire according to the present invention, a minimum distance between an inner end at the first tread edge side of the opening edge of the recess and an edge of the groove element at the bottom surface is preferably 1.0 to 3.0 mm.

In the tire according to the present invention, a length in the tire radial direction of the bottom surface is preferably 2.0 to 3.0 times a length in the tire radial direction of the groove element.

In the tire according to the present invention, preferably, in a horizontal cross section passing through the recess and extending in a longitudinal direction of the shoulder composite groove through a maximum width position of the groove element, an angle, relative to a tire circumferential direction, of a straight line connecting the opening edge of the recess to the edge of the groove element at the bottom surface is less than 35°.

In the tire according to the present invention, preferably, in a state where at least a part of the opening edge of the recess is brought into contact with a flat surface by mounting the tire to a normal rim, inflating the tire to a normal internal pressure, and bringing the tread portion into contact with the flat surface to apply a vertical load to the tire, the edge of the groove element at the bottom surface is not brought into contact with the flat surface.

The first shoulder land portion of the tire according to the present invention has a shoulder composite groove crossing the first tread edge and open at the buttress surface. The shoulder composite groove includes, in a transverse cross section thereof, a sipe element having a width not greater than 1.5 mm and extending in the tire radial direction, and a groove element connected to an inner side in the tire radial direction of the sipe element and having a width greater than 1.5 mm.

In the tire according to the present invention, the first shoulder land portion has a recess formed on the buttress surface. The recess includes an opening edge on the buttress surface, a bottom surface along the buttress surface, and an inner wall surface connecting the opening edge to the bottom surface. In addition, the groove element is open at the bottom surface of the recess. Accordingly, in the tire according to the present invention, even during sharp cornering in which the buttress surface is brought into contact with the ground, the edge of the groove element is less likely to be brought into contact with the ground, so that stress is less likely to be concentrated on the edge of the groove element. Therefore, the tire according to the present invention can effectively inhibit damage of the first shoulder land portion.

DESCRIPTION OF THE PREFERRED EMBODIMENTS

Figure 1:
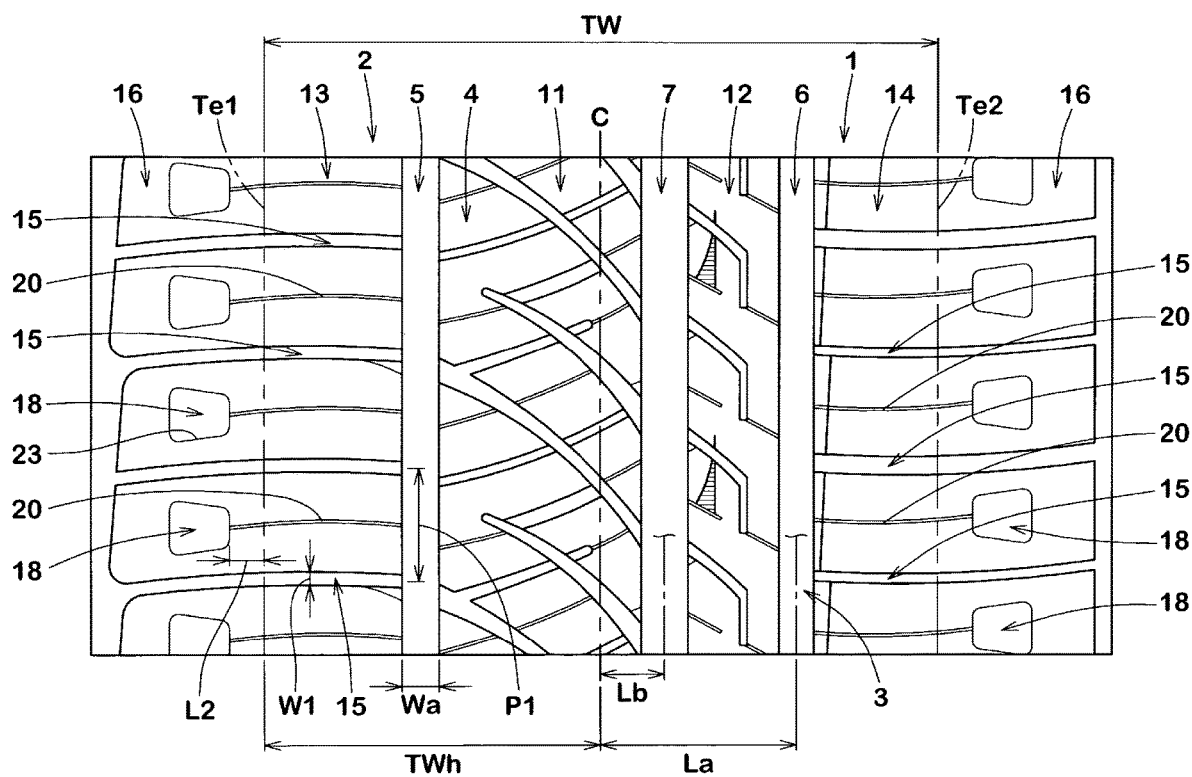
FIG. 1 is a development of a tread portion of a tire according to an embodiment of the present invention.

Hereinafter, an embodiment of the present invention will be described with reference to the drawings. FIG. 1 is a development of a tread portion 2 of a tire 1 showing the embodiment of the present invention. The tire 1 according to the present embodiment is suitably used, for example, as a pneumatic tire for a passenger car. However, the present invention is not limited to such a mode, and may be applied to a heavy-duty pneumatic tire and a non-pneumatic tire the interior of which is not filled with pressurized air.

As shown in FIG. 1, the tire 1 according to the present embodiment has, for example, the tread portion 2 having a designated mounting direction to a vehicle. The tread portion 2 has a first tread edge Te1 located at the outer side of a vehicle when the tire 1 is mounted on the vehicle, and a second tread edge Te2 located at the inner side of the vehicle when the tire 1 is mounted on the vehicle. The mounting direction to a vehicle is indicated, for example, on a sidewall portion (not shown) by characters or a symbol.

In the case of a pneumatic tire, each of the first tread edge Te1 and the second tread edge Te2 is a ground contact position at the outermost side in the tire axial direction when a normal load is applied to the tire 1 in a normal state and the tire 1 is brought into contact with a flat surface at a camber angle of 0°. The normal state is a state where the tire is mounted to a normal rim and inflated to a normal internal pressure and no load is applied to the tire. In the present specification, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 includes three main grooves 3 continuously extending in the tire circumferential direction between the first tread edge Te1 and the second tread edge Te2, and four land portions 4 demarcated by the three main grooves 3.

The main grooves 3 include a first shoulder main groove 5 provided between the first tread edge Te1 and a tire equator C, a second shoulder main groove 6 provided between the second tread edge Te2 and the tire equator C, and a crown main groove 7 provided between the first shoulder main groove 5 and the second shoulder main groove 6.

The distance La in the tire axial direction from the tire equator C to a groove center line of the first shoulder main groove 5 or the second shoulder main groove 6 is, for example, preferably 0.20 to 0.35 times a tread width TW. The distance Lb in the tire axial direction from the tire equator C to a groove center line of the crown main groove 7 is, for example, preferably not greater than 0.15 times the tread width TW. The tread width TW is the distance in the tire axial direction from the first tread edge Te1 to the second tread edge Te2 in the normal state.

The crown main groove 7 of the present embodiment is provided, for example, between the tire equator C and the second tread edge Te2. However, the position of the crown main groove 7 is not limited to such a position.

Each main groove 3 of the present embodiment extends, for example, in a straight manner so as to be parallel to the tire circumferential direction. Each main groove 3 may extend, for example, in a wavy manner.

The groove width Wa of each main groove 3 is at least not less than 3.0 mm and is, for example, preferably 4.0% to 7.0% of the tread width TW. In the present specification, a longitudinal narrow groove having a groove width less than 3.0 mm is distinguished from the main grooves 3. In addition, a groove width is the distance between groove edges in a direction orthogonal to a groove center line. In the case of a pneumatic tire for a passenger car, the depth of each main groove 3 is, for example, preferably 5 to 10 mm.

The land portions 4 include a first middle land portion 11, a second middle land portion 12, a first shoulder land portion 13, and a second shoulder land portion 14. The first middle land portion 11 is demarcated between the first shoulder main groove 5 and the crown main groove 7. The second middle land portion 12 is demarcated between the second shoulder main groove 6 and the crown main groove 7. The first shoulder land portion 13 is demarcated between the first shoulder main groove 5 and the first tread edge Te1. The second shoulder land portion 14 is demarcated between the second shoulder main groove 6 and the second tread edge Te2. In the present embodiment, when the widths in the tire axial direction of the tread surfaces of the respective land portions are compared to each other, the first middle land portion 11 has the largest width among the four land portions. However, the present invention is not limited to such a mode.

Figure 2:
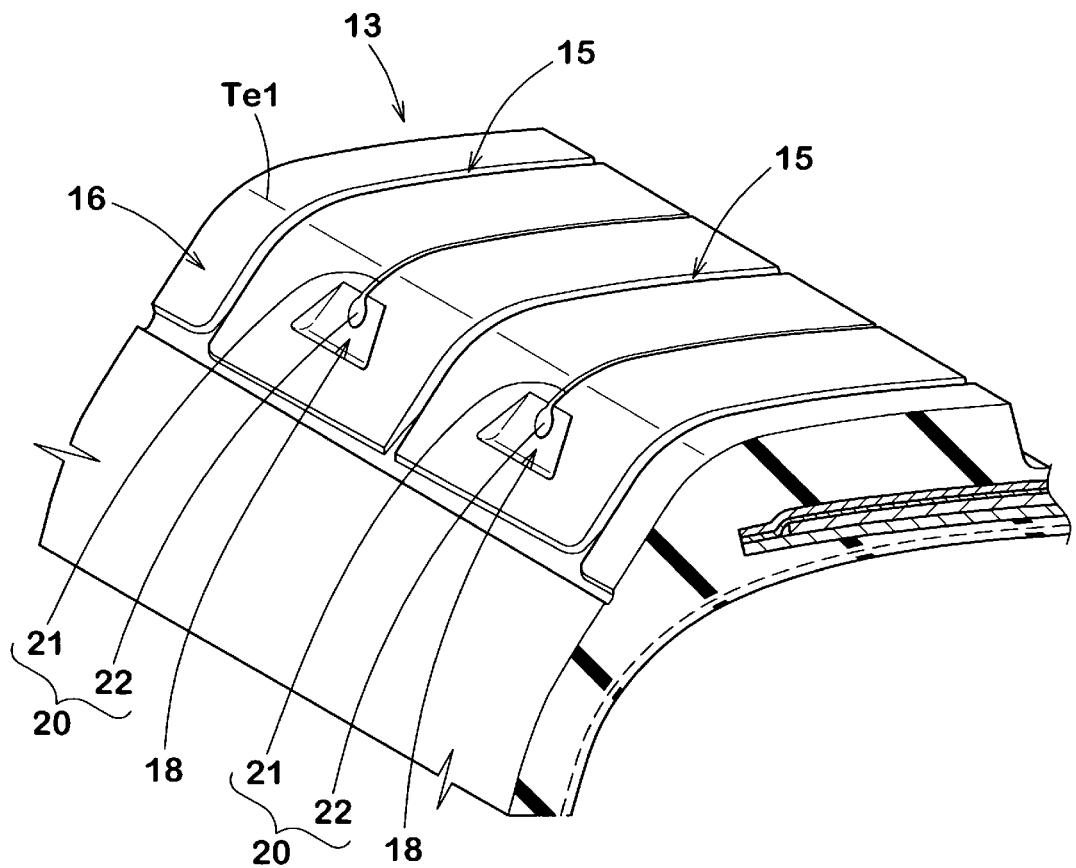
FIG. 2 is an enlarged perspective view of a first shoulder land portion in FIG. 1.

FIG. 2 shows an enlarged perspective view of the first shoulder land portion 13. As shown in FIG. 2, the first shoulder land portion 13 includes a buttress surface 16 outward of the first tread edge Te1 in the tire axial direction.

The first shoulder land portion 13 has a plurality of shoulder composite grooves 20 crossing the first tread edge Te1 and open at the buttress surface 16, and a plurality of recesses 18 formed on the buttress surface 16. The first shoulder land portion 13 of the present embodiment has a plurality of shoulder lateral grooves 15 extending from the first shoulder main groove 5 to the first tread edge Te1. The shoulder composite grooves 20 and the shoulder lateral grooves 15 are alternately provided in the tire circumferential direction.

Figure 3:
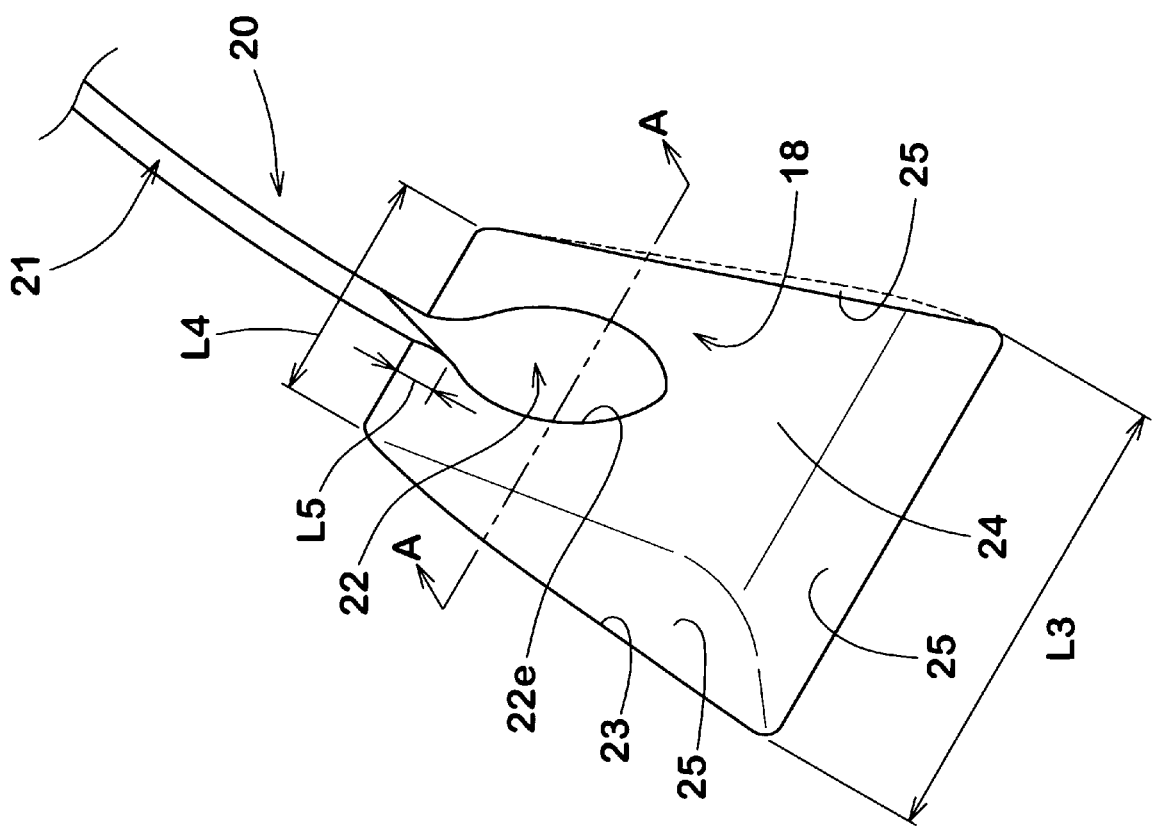
FIG. 3 is an enlarged perspective view of a recess in FIG. 2.

FIG. 3 shows an enlarged perspective view of the recess 18. As shown in FIG. 3, the recess 18 includes an opening edge 23 on the buttress surface 16, a bottom surface 24 along the buttress surface 16, and an inner wall surface 25 connecting the opening edge 23 to the bottom surface 24. The bottom surface 24 includes not only a surface extending parallel to the buttress surface 16 but also a surface inclined relative to the buttress surface 16. The inclination angle of the bottom surface 24 relative to the buttress surface 16 is, for example, not greater than 20°.

Figure 4:
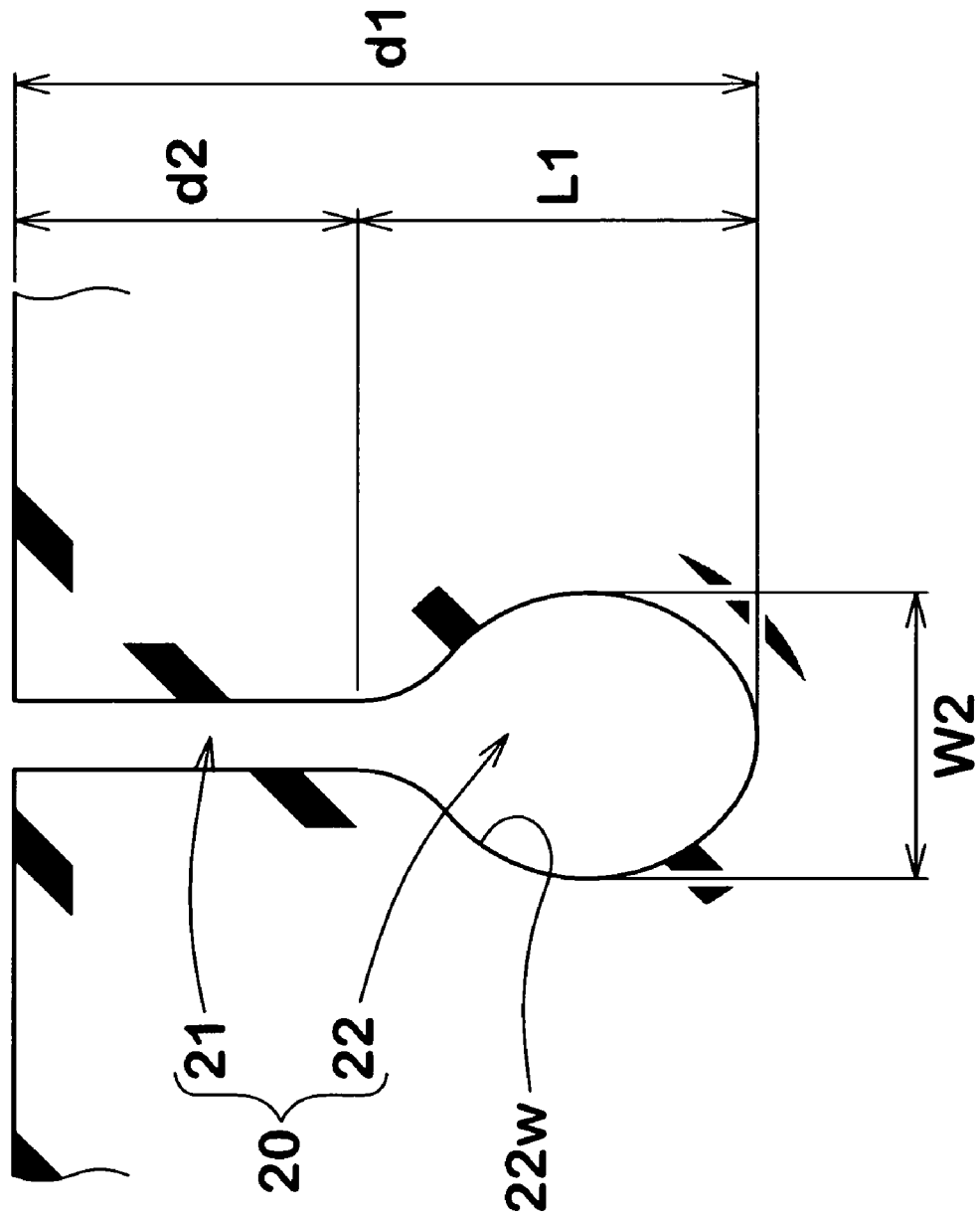
FIG. 4 is a transverse cross-sectional view of a shoulder composite groove.

FIG. 4 shows a transverse cross-sectional view of the shoulder composite groove 20. As shown in FIG. 4, the shoulder composite groove 20 includes, in a transverse cross section thereof, a sipe element 21 having a width not greater than 1.5 mm and extending in the tire radial direction, and a groove element 22 connected to the inner side in the tire radial direction of the sipe element 21 and having a width greater than 1.5 mm Such a shoulder composite groove 20 enhances wet performance while maintaining the stiffness of the first shoulder land portion 13.

As shown in FIG. 3, the groove element 22 is open at the bottom surface 24 of the recess 18. Accordingly, in the tire according to the present invention, even during sharp cornering in which the buttress surface 16 is brought into contact with the ground, an edge 22e of the groove element 22 is less likely to be brought into contact with the ground, so that stress is less likely to be concentrated on the edge 22e of the groove element 22. Therefore, the tire according to the present invention can effectively inhibit damage of the first shoulder land portion 13.

As shown in FIG. 4, in each shoulder composite groove 20, for example, the sipe element 21 extends from the tread surface in the tire radial direction with a uniform width, and the groove element 22 is formed at the groove bottom. The depth d1 of each shoulder composite groove 20 is, for example, preferably smaller than the depth of each shoulder lateral groove 15. Specifically, the depth d1 is preferably 0.85 to 0.95 times the depth of each shoulder lateral groove 15. Such a shoulder composite groove 20 serves to enhance dry performance and wet performance in a well-balanced manner.

The sipe element 21 extends, for example, from the tread surface of the first shoulder land portion 13 to the groove element 22 in the tire radial direction with a uniform width. The depth d2 of the sipe element 21 is, for example, preferably smaller than the depth of each shoulder lateral groove 15. Specifically, the depth d2 of the sipe element 21 is preferably 0.40 to 0.60 times the depth of each shoulder lateral groove 15.

The groove element 22 has, for example, a width that smoothly and gradually increases from an outer end portion in the tire radial direction thereof to a maximum width position thereof and that smoothly and gradually decreases from the maximum width position to the bottom of the groove element 22. Accordingly, the groove element 22 includes a smoothly curved inner wall 22w. Such an inner wall 22w inhibits damage such as a crack of the first shoulder land portion 13 starting from the groove element 22.

The width W2 of the groove element 22 is, for example, preferably smaller than the groove width W1 (shown in FIG. 1) of each shoulder lateral groove 15. The width W2 of the groove element 22 is, for example, preferably 0.50 to 0.80 times the groove width W1 of each shoulder lateral groove 15. Specifically, the width W2 of the groove element 22 is 2.0 to 3.0 mm Such a groove element 22 can be expected to exhibit excellent drainage performance while maintaining dry performance.

The length L1 in the tire radial direction of the groove element 22 is, for example, preferably larger than the width W2 of the groove element 22. Accordingly, the groove element 22 of the present embodiment is formed in an elliptical shape that is long in the tire radial direction. The length L1 of the groove element 22 is, for example, preferably 1.10 to 1.50 times the width W2 of the groove element 22.

As shown in FIG. 3, the groove element 22 is open at the bottom surface 24 without protruding from the bottom surface 24. Accordingly, damage of the first shoulder land portion 13 is reliably inhibited.

As shown in FIG. 1, in the present embodiment, the entirety of the opening edge 23 of the recess 18 is located outward of the first tread edge Te1 in the tire axial direction. When the distance L2 in the tire axial direction from the first tread edge Te1 to the opening edge 23 (hereinafter, sometimes referred to as separation distance L2 of the recess 18) is small, uneven wear tends to easily occur at the recess 18. When the separation distance L2 of the recess 18 is large, wet performance tends to be deteriorated. Thus, the separation distance L2 of the recess 18 is, for example, 0.05 to 0.15 times a tread half width TWh from the tire equator C to the first tread edge Te1. Accordingly, during straight running, the opening edge 23 is not brought into contact with the ground, so that uneven wear in the vicinity of the opening edge 23 is inhibited.

As shown in FIG. 3, the length in the tire circumferential direction of the recess 18 preferably gradually increases toward the inner side in the tire radial direction. The opening edge 23 of the recess 18 of the present embodiment has, for example, a trapezoidal shape. Such a recess 18 is less likely to cause stone trapping and serves to enhance durability.

The minimum length L4 in the tire circumferential direction of the recess 18 is preferably 0.50 to 0.70 times the maximum length L3 in the tire circumferential direction of the recess 18. Even when stone trapping occurs in such a recess 18, the recess 18 can easily discharge the foreign matter trapped therein with deformation of the first shoulder land portion 13.

The maximum length L3 in the tire circumferential direction of the recess 18 is preferably 0.10 to 0.40 times an arrangement pitch P1 (shown in FIG. 1) in the tire circumferential direction of the shoulder composite grooves 20. Such a recess 18 can contribute to improvement of wet performance while maintaining durability.

The minimum distance L5 between the inner end at the first tread edge Te1 side of the opening edge 23 of the recess 18 and the edge 22e of the groove element 22 at the bottom surface 24 is, for example, preferably 0.5 to 3.0 mm. Accordingly, concentration of stress on the groove element 22 is further inhibited, so that durability is improved.

The length in the tire radial direction of the bottom surface 24 is preferably 2.0 to 3.0 times the length in the tire radial direction of the groove element 22. Accordingly, concentration of stress on the groove element 22 can be reliably inhibited.

The depth of the recess 18 gradually decreases toward the outer side in the tire radial direction. The maximum depth of the recess 18 is, for example, preferably 1.5 to 3.0 mm. The maximum depth corresponds to the length of a virtual normal line extended to the bottom surface 24 so as to be perpendicular to a virtual surface closing the recess 18 along the buttress surface 16.

Figure 5:
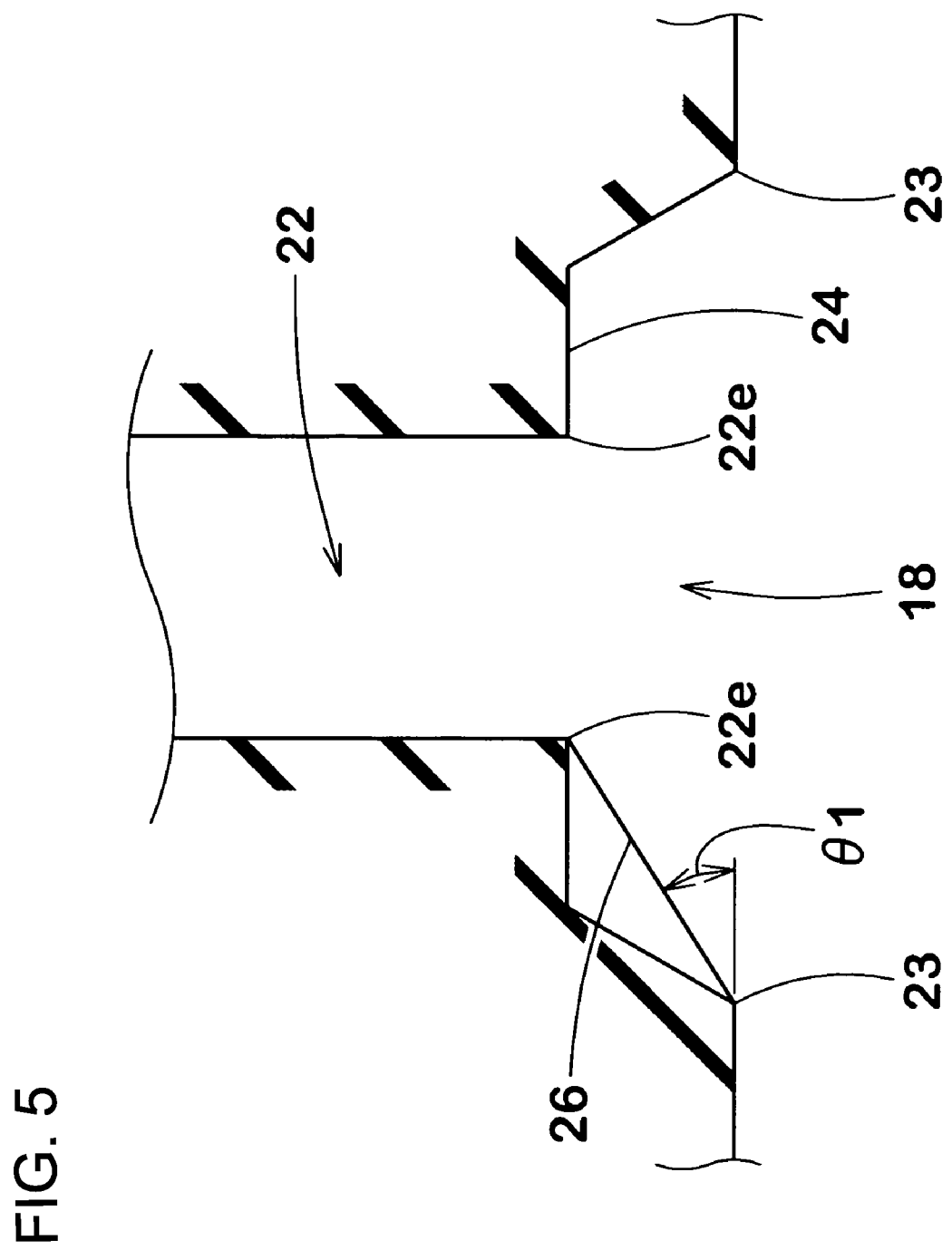
FIG. 5 shows a cross section taken along a line A-A in FIG. 3.

FIG. 5 shows a horizontal cross-section passing through the recess 18 and extending in the longitudinal direction of the shoulder composite groove 20 through the maximum width position of the groove element 22. FIG. 5 corresponds to a cross section taken along a line A-A in FIG. 3. As shown in FIG. 5, in the horizontal cross section, an angle θ1 (hereinafter, sometimes referred to as exit angle θ1), relative to the tire circumferential direction, of a straight line 26 connecting the opening edge 23 of the recess 18 to the edge 22e of the groove element 22 at the bottom surface 24 is less than 35°. The exit angle θ1 is more preferably 25 to 30°. Accordingly, even when stress acts in a direction in which the recess 18 is widened, great stress can be inhibited from acting on the edge 22e of the groove element 22.

In the tire 1 according to the present embodiment, in a state where at least a part of the opening edge 23 of the recess 18 is brought into contact with a flat surface by, for example, mounting the tire 1 to a normal rim, inflating the tire 1 to a normal internal pressure, and bringing the tread portion 2 into contact with the flat surface to apply a vertical load to the tire 1, the edge 22e of the groove element 22 at the bottom surface 24 is not brought into contact with the flat surface. Accordingly, stress is not concentrated on the groove element 22, so that the durability of the first shoulder land portion 13 is improved. The state where the opening edge 23 of the recess 18 is brought into contact with the flat surface is obtained in a pseudo manner by, for example, bringing the tire 1 in the normal state into contact with the flat surface at a camber angle of 4° and applying the normal load to the tire 1.

As shown in FIG. 1, the shoulder lateral grooves 15 and the shoulder composite grooves 20 are preferably curved in the same direction in the tire circumferential direction. The radius of curvature of each shoulder composite groove 20 is preferably larger than the radius of curvature of each shoulder lateral groove 15. The radius of curvature of each shoulder composite groove 20 is, for example, 1.03 to 1.10 times the radius of curvature of each shoulder lateral groove 15. Such shoulder composite grooves 20 and shoulder lateral grooves 15 can inhibit strain of the tread surface of the first shoulder land portion 13.

The second shoulder land portion 14 of the tire 1 according to the present embodiment has the same configuration as the above-described first shoulder land portion 13. Accordingly, the durability of the shoulder land portions at both sides is improved.

Although the tire according to the embodiment of the present invention has been described in detail above, the present invention is not limited to the above specific embodiment, and various modifications can be made to implement the present invention.

Examples

Tires with a size of 215/60R16 having the basic pattern in FIG. 1 were produced as test tires. As a comparative example, a tire in which a first shoulder land portion is provided with a recess a having a cross-sectional shape shown in FIG. 6 was produced as a test tire. The recess a of the comparative example does not include a bottom surface, and an inner wall surface c is connected to a groove element b of a shoulder composite groove. The tire of the comparative example is substantially the same as shown in FIG. 1, except for the above matters. The respective test tires were tested for durability and wet performance. The common specifications and the test methods for the respective test tires are as follows.

Mount rim: 16×6.5
Tire internal pressure: 240 kPa
Test vehicle: a front-wheel-drive car having an engine displacement of 2500 cc
Tire mounted position: all wheels <Durability>
The degree of damage of the buttress surface of the first shoulder land portion was visually evaluated by a driver after the driver drove the above test vehicle on a dry road surface for a certain distance. The results are indicated as scores with the score of the comparative example being regarded as 100. A higher value indicates that the degree of damage of the buttress surface is lower and the durability is better.

<Wet Performance>
Sensory evaluation was made by a driver for performance when the driver drove the above test vehicle on a wet road surface. The results are indicated as scores with the score of the comparative example being regarded as 100. A higher value indicates that the wet performance is better.

The test results are shown in Table 1.

TABLE 1

Figure 6:
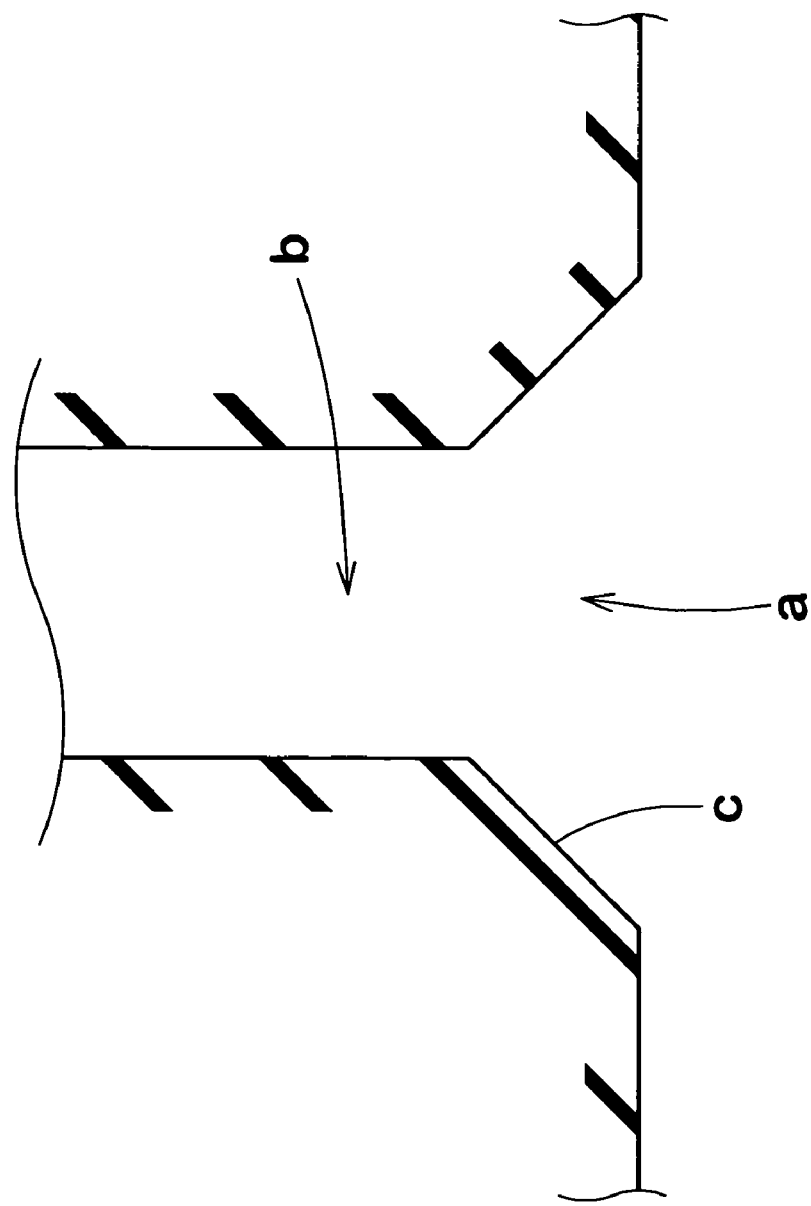
FIG. 6 is a horizontal cross-sectional view of a recess and a shoulder composite groove of a tire of a comparative example.

| | Comparative Example | Example 1 | Example 2 | Example 3 | Example 4 | Example 5 | Example 6 | Example 7 | Example 8 | Example 9 |
|---|---|---|---|---|---|---|---|---|---|---|
| Drawing showing longitudinal cross-section of recess and shoulder composite groove | FIG. 6 | FIG. 5 | FIG. 5 | FIG. 5 | FIG. 5 | FIG. 5 | FIG. 5 | FIG. 5 | FIG. 5 | FIG. 5 |
| Separation distance L2 of recess/tread half width TWh | 0.10 | 0.10 | 0.05 | 0.08 | 0.12 | 0.15 | 0.10 | 0.10 | 0.10 | 0.10 |
| Exit angle θ1 of recess (°) | 45 | 30 | 30 | 30 | 30 | 30 | 20 | 25 | 35 | 40 |
| Durability (score) | 100 | 110 | 106 | 108 | 110 | 111 | 106 | 108 | 107 | 105 |
| Wet performance (score) | 100 | 105 | 106 | 105 | 104 | 102 | 106 | 105 | 105 | 104 |

As a result of the tests, it was confirmed that, in the tire of each Example, the durability of the first shoulder land portion is improved. In addition, it was confirmed that, in the tire of each Example, wet performance is also improved.

What is claimed is:
1. A tire comprising a tread portion, wherein
the tread portion includes a first shoulder land portion including a first tread edge,
the first shoulder land portion includes a buttress surface outward of the first tread edge in a tire axial direction,
the first shoulder land portion has a shoulder composite groove crossing the first tread edge and open at the buttress surface, and a recess formed on the buttress surface,
the recess includes an opening edge on the buttress surface, a bottom surface along the buttress surface, and an inner wall surface connecting the opening edge to the bottom surface,
the shoulder composite groove includes, in a transverse cross section thereof, a sipe element having a width not greater than 1.5 mm and extending in a tire radial direction, and a groove element connected to an inner side in the tire radial direction of the sipe element and having a width greater than 1.5 mm, the groove element is open at the bottom surface of the recess, in a horizontal cross section passing through the recess and extending in a longitudinal direction of the shoulder composite groove through a maximum width position of the groove element, an angle, relative to a tire circumferential direction, of a straight line connecting the opening edge of the recess to an edge of the groove element at the bottom surface is 20° to 40° and the tread having a half width in the radial direction TWh, and a separation distance L2 in the tire axial direction from the first tread edge to the opening edge, wherein L2/TWh is 0.05 to 0.15.

2. The tire according to claim 1, wherein an entirety of the opening edge of the recess is located outward of the first tread edge in the tire axial direction.

3. The tire according to claim 1, wherein the groove element is open at the bottom surface without protruding from the bottom surface.

4. The tire according to claim 1, wherein a length in the tire circumferential direction of the recess gradually increases toward an inner side in the tire radial direction.

5. The tire according to claim 4, wherein the opening edge of the recess has a trapezoidal shape.

6. The tire according to claim 4, wherein a minimum length in the tire circumferential direction of the recess is 0.50 to 0.70 times a maximum length in the tire circumferential direction of the recess.

7. The tire according to claim 1, wherein
a plurality of the shoulder composite grooves is provided in the tire circumferential direction, and
a maximum length in the tire circumferential direction of the recess is 0.10 to 0.40 times an arrangement pitch in the tire circumferential direction of the shoulder composite grooves.

8. The tire according to claim 1, wherein a minimum distance between an inner end at the first tread edge side of the opening edge of the recess and the edge of the groove element at the bottom surface is 0.5 to 3.0 mm.

9. The tire according to claim 1, wherein a length in the tire radial direction of the bottom surface is 2.0 to 3.0 times a length in the tire radial direction of the groove element.

10. The tire according to claim 1, wherein
in the horizontal cross section passing through the recess and extending in the longitudinal direction of the shoulder composite groove through the maximum width position of the groove element,
the angle, relative to the tire circumferential direction, of the straight line connecting the opening edge of the recess to the edge of the groove element at the bottom surface is less than 35°.

11. The tire according to claim 1, wherein, in a state where at least a part of the opening edge of the recess is brought into contact with a flat surface by mounting the tire to a normal rim, inflating the tire to a normal internal pressure, and bringing the tread portion into contact with the flat surface to apply a vertical load to the tire, the edge of the groove element at the bottom surface is not brought into contact with the flat surface.

12. The tire according to claim 1, wherein the first shoulder land portion has a plurality of shoulder lateral grooves extending from the first shoulder main groove to the first tread edge, wherein the shoulder composite grooves and the shoulder lateral grooves are alternately provided in the tire circumferential direction.

13. The tire according to claim 12, wherein a depth of each shoulder composite groove is smaller than a depth of each shoulder lateral groove.

14. The tire according to claim 12, wherein a width of the groove element is smaller than a groove width of each shoulder lateral groove.

15. The tire according to claim 2, wherein a length in the tire radial direction of the bottom surface is 2.0 to 3.0 times a length in the tire radial direction of the groove element.

16. The tire according to claim 3, wherein a length in the tire radial direction of the bottom surface is 2.0 to 3.0 times a length in the tire radial direction of the groove element.

17. The tire according to claim 4, wherein a length in the tire radial direction of the bottom surface is 2.0 to 3.0 times a length in the tire radial direction of the groove element.

18. The tire according to claim 9, wherein
in the horizontal cross section passing through the recess and extending in the longitudinal direction of the shoulder composite groove through the maximum width position of the groove element,
the angle, relative to the tire circumferential direction, of the straight line connecting the opening edge of the recess to the edge of the groove element at the bottom surface is less than 35°.

19. The tire according to claim 9, wherein, in a state where at least a part of the opening edge of the recess is brought into contact with a flat surface by mounting the tire to a normal rim, inflating the tire to a normal internal pressure, and bringing the tread portion into contact with the flat surface to apply a vertical load to the tire, the edge of the groove element at the bottom surface is not brought into contact with the flat surface.

* * * * *